(12) United States Patent
Cheng et al.

(10) Patent No.: US 6,386,422 B1
(45) Date of Patent: May 14, 2002

(54) SOLDER REFLOW OVEN

(75) Inventors: Chi Wah Cheng; Ping Chun Benson Chong; Hoi Shuen Joseph Tang; Kai Chiu Adam Wu; Ka On Alfred Yue, all of Kwai Chung (HK)

(73) Assignee: ASM Assembly Automation Limited (HK)

( * ) Notice: Subject to any disclaimer, the term of this patent is extended or adjusted under 35 U.S.C. 154(b) by 0 days.

(21) Appl. No.: 09/847,278

(22) Filed: May 3, 2001

(51) Int. Cl.[7] ............. B23K 1/00; F27D 15/02; F27B 9/02
(52) U.S. Cl. ............. 228/46; 432/80; 432/128
(58) Field of Search ............. 228/200, 222, 228/46; 432/77, 80, 128

(56) References Cited

U.S. PATENT DOCUMENTS

| | | | |
|---|---|---|---|
| 4,771,929 A | * | 9/1988 | Bahr et al. |
| 5,039,841 A | * | 8/1991 | Kato et al. |
| 5,338,008 A | * | 8/1994 | Okuno et al. |
| 5,567,151 A | * | 10/1996 | Mizoguchi et al. |
| 5,611,476 A | * | 3/1997 | Soderlund et al. |
| 5,785,233 A | * | 7/1998 | Nutter et al. |
| 5,797,539 A | * | 8/1998 | Wilde et al. |
| 6,135,344 A | * | 10/2000 | Sakuyama et al. |
| 6,288,376 B1 | * | 9/2001 | Tsumura |

FOREIGN PATENT DOCUMENTS

DE  3837531 A1  * 5/1990
JP  405060472 A  * 3/1993

OTHER PUBLICATIONS

US 2001/0030184 A1 (Oct. 18, 2001) Richert et al.*

* cited by examiner

Primary Examiner—Tom Dunn
Assistant Examiner—Kiley Stoner
(74) Attorney, Agent, or Firm—Burns, Doane, Swecker & Mathis, L.L.P.

(57) ABSTRACT

A solder reflow oven for the processing of ball grid array substrates bearing solder balls is described, comprising: input means for introducing substrates into the oven, a processing chamber within which the substrates are subject to a solder reflow process, and output means for discharging substrates from the oven for further processing or handling, and means for transferring the substrates through the processing chamber in a first direction towards the output means. The processing chamber comprises a plurality of heating and cooling zones arranged with a constant pitch in the first direction, and the transferring means is adapted to move the substrates in the first direction in stages, with each component moving a distance equal to the pitch between two zones in each stage, whereby the components are moved from zone to zone in stages. In addition each block of each heating zone and each block of each cooling zone is connected to a source of fresh gas, and each block of each heating zone is provided with means for heating the gas, and each block of each cooling zone is provided with means for cooling the gas, and each block is formed with a serpentine channel between the source of fresh gas and at least one opening through which the gas is discharged from the block towards a substrate.

42 Claims, 8 Drawing Sheets

FIG. 4  HEATING ZONES    COOLING ZONES

SOLDER REFLOW OVEN

FIELD OF THE INVENTION

This invention relates to a solder reflow oven, and in particular to such an oven suitable for reflowing solder balls placed on solder pads of a ball grid array (BGA) substrate. The invention also relates to a compact and advantageous system for solder ball attachment in BGA electronic packages.

BACKGROUND OF THE INVENTION

A ball grid array (BGA) is a well-known and increasingly popular form of electronic package design for the use in the manufacture of integrated circuits. One of the important steps in the manufacturing process for a BGA is the firm attachment of solder balls onto solder pads formed on a BGA substrate. The solder ball is used to maintain electrical connectivity between the BGA substrate and any components attached thereto. The attachment of the solder balls to the solder pads involves two main steps: (1) solder ball placement, and (2) solder reflow. The first step involves the picking of a number of solder balls from a supply means by a pick head, and then the placement of those balls in a desired pattern on the BGA substrate such that one solder ball is placed on each solder pad. The second process involves the solder balls being melted and reflowed on the solder pads of the substrate. The present invention is concerned in particular with this second step.

The solder reflow step involves four well-defined phases: preheat, soak, reflow (spike) and cooling. Firstly, in the preheat phase the solder balls are warmed to a temperature that is just below the melting point of the solder. For example the balls may be heated to about 30° C. below a melting point of 183° C. In the soak phase, the flux that is used to adhere the solder balls to the solder pads is activated to remove oxide on the pads, and the temperature of the substrate and the solder balls are allowed to become more uniform and stabilized. During this soak period the temperature of the solder balls and the substrate is nearly constant or may increase slightly, for example by about 20° C. In the reflow or spike period the temperature is caused to increase rapidly, and exceed the melting point by between 20° C. and 50° C. such that the solder balls will melt and wet the solder pads. Finally, in the cooling phase the solder balls and the substrate are allowed to cool to a temperature well below the melting point of the solder such that the solder balls solidify and the reflow process is complete.

PRIOR ART

The solder ball reflow process is analogous to the solder reflow of electronic components onto a printed circuit board (PCB) for which many types of reflow oven have been developed. Conventionally such PCB reflow ovens have been used for carrying out solder ball reflow. However, PCB reflow is a more complex operation that requires as a result an oven that is larger, more complex and more expensive than might be necessary for solder ball reflow alone. Furthermore it is not generally possible, or at least is not easy, to incorporate a PCB reflow oven being used as a solder reflow oven into the small compact and convenient BGA manufacturing process. There is therefore a need for a small, simple and relatively low-cost solder reflow oven that can easily be incorporated into a BGA manufacturing process.

SUMMARY OF THE INVENTION

According to the present invention there is provided a solder reflow oven for the processing of components bearing solder, comprising: input means for introducing components into said oven, a processing chamber within which said components are subject to a solder reflow process, and output means for discharging components from said oven for further processing or handling, and means for transferring said components through said processing chamber in a first direction towards said output means, wherein said processing chamber comprises a plurality of heating and cooling zones arranged with a constant pitch in the first direction, and wherein said transferring means is adapted to move said components in said first direction in stages, with each component moving a distance equal to the pitch between two zones in each stage, whereby the components are moved from zone to zone in stages.

According to another aspect of the present invention there is provided a solder reflow oven for the processing of components bearing solder, comprising: input means for introducing components into said oven, a processing chamber within which said components are subject to a solder reflow process, and output means for discharging components from said oven for further processing or handling, and means for transferring said components through said processing chamber in a first direction towards said output means, wherein said processing chamber comprises a plurality of heating and cooling zones, wherein each said block of each said heating zone and each said block of each said cooling zone is connected to a source of fresh gas, wherein each block of each said heating zone is provided with means for heating said gas, and each block of each said cooling zone is provided with means for cooling said gas, and wherein each block is formed with a serpentine channel between said source of fresh gas and at least one opening through which said gas is discharged from said block towards a component.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
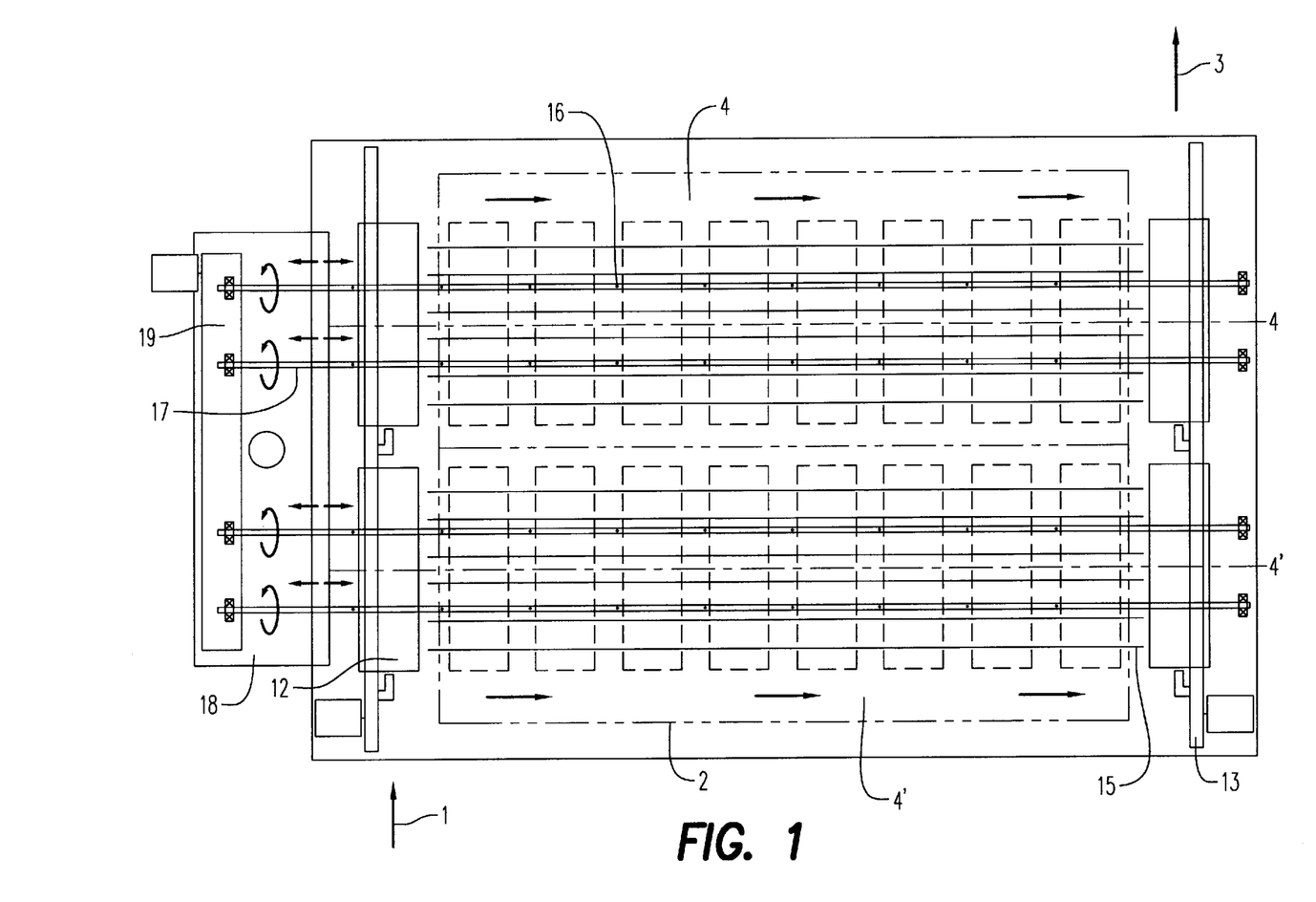
FIG. 1 is top view of an oven according to an embodiment of the present invention.
Figure 2:
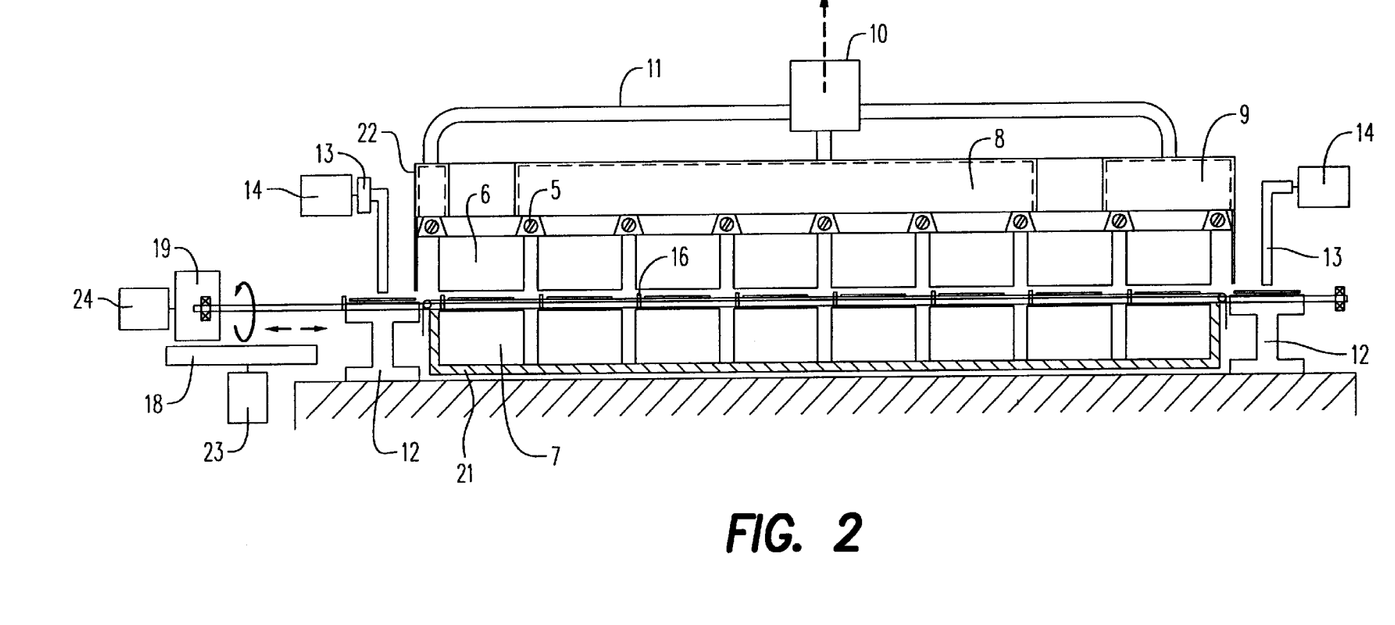
FIG. 2 is a side view of the embodiment of FIG. 1.

FIGS. 1 and 2 show the overall structure of a solder reflow oven in accordance with an embodiment of the present invention. The oven comprises an input station 1, a process chamber 2, and an output station 3. BGA substrates on which solder balls have been placed enter the oven through the input station 1, are subject to the reflow process within process chamber 2, and are output from the oven after reflow is complete through output 3. In this specification the term "process direction" means the direction of travel of the substrates through the process chamber towards the output station. It should be noted from FIG. 1 that in this embodiment of the invention, the oven comprises two parallel tunnels 4,4' that allow reflow of two sets of substrates to be carried out simultaneously. However, the number of tunnels is not limited to two, and in fact it can be more than two when higher throughput is necessary. Each tunnel 4,4' within the process chamber 2 is divided into a number of heating zones and cooling zones in a manner to be described in further detail below. Each zone is of identical length in the process direction and the zones are separated by a constant pitch. Each zone is provided with upper and lower blocks 6,7 and the substrates are caused to pass between those blocks. The lower blocks are received within an enclosure 21, and the whole oven is located on a base.

As will be described in more detail below, gas such as air or nitrogen is supplied to the blocks 6,7 forming the heating zones and cooling zones where it is respectively heated or cooled before being applied to a BGA substrate passing through the zones. Afterwards the gas is extracted through control valves 5 located between adjacent zones. Gas from the heating zones is led through a heating gas chamber 8, while gas from the cooling zones is led through a cooling gas chamber 9. In front of the first heating zone is provided a gas curtain that functions to collect air and process gas from the first zone, and also prevents external air from entering the oven. The gas curtain is connected to a gas curtain chamber 22. Gas is drawn through the control valves 5 and chambers 8,9,22 by gas pump 10 connected to the chambers by means of hoses 11. This arrangement ensures that used and potentially contaminated gas is extracted properly, furthermore the heated and cooled gas do not mix until they reach the gas pump, and this assists in preventing unwanted flux condensation.

At the input station 1, two substrates are supplied at a time on input platforms 12. Two substrates are moved by means of input kickers 13, operated by kicker motors 14 through for example a belt and pulley system, to the positions shown in FIG. 1 such that a substrate is located adjacent the end of each tunnel 4,4' ready to be moved along the tunnels for the reflow process. In this position each substrate is located so that the center of the substrate lies on the axis of a tunnel. The manner in which the substrates are moved though the process chamber 2 will now be described.

Extending along each tunnel 4,4' of the process chamber, in the direction of movement of the substrates through the process chamber, are provided tension wire assemblies 15 on which the substrates rest. For example each tunnel may be provided with six tension wires extending along the tunnel, though the exact number may be varied as desired but should be more than two. Located along each tunnel 4,4' and spaced from each other by the pitch of two zones of the process chamber, are a plurality of transfer pins 16. The transfer pins 16 are fixed to respective transfer rods 17, two for each tunnel 4,5 in this embodiment though any number of transfer rods may be provided. The transfer rods 17 may be moved laterally along the axes of the tunnels by a transfer rod linear mechanism 18, and the transfer rods 17 may be rotated about their axes by means of a transfer rod rotary mechanism 19. The transfer rod linear and rotary mechanisms 18,19 are provided in a housing located at the end of the oven adjacent the inlet 1. The linear and rotary mechanisms 18,19 are driven by respective motors 23,24.

The transfer rod rotary mechanism 19 causes the transfer pins 16 to rotate through 90° from a position in which they extend through the tension wire assemblies, to a position in which they are parallel to the tension wire assemblies 15, and vice versa. When the transfer pins 16 are in their first position (ie extending through the tension wire assemblies 15) movement of the transfer rod linear mechanism 18 in the process direction through the process chamber 2 causes the transfer pins 16 to engage the substrates supported on the tension wire assemblies 15 so as to move them in the process direction (ie through the tunnels from the inlet 1 towards the outlet 3). When the transfer pins 16 are in their second position, movement of the transfer rod linear mechanism 18 in the direction opposite to the process direction causes the pins 16 to return without engaging the substrates.

The cycle of operation of the transfer pins will now be described. To begin the transfer pins 16 are in their first position in which they extend through the tension wire assemblies 15. Operation of the transfer rod linear mechanism 18 then causes the transfer pins 16 to move the substrates in the process direction for a distance equal to the pitch in the process direction of two adjacent zones of the process chamber 2. The transfer rod rotary mechanism 19 is then operated to rotate the transfer rod 17 such that the pins 16 are in their second position and no longer extend through the tension wire assemblies 15 to engage the substrates. The transfer rod 17 may then be retracted by the transfer rod linear mechanism 18 the distance of the pitch of two zones, and the transfer pins 16 are then rotated back to their first position by the transfer rod rotary mechanism 19 so that the operation may begin again. It will be understood that in the manner the substrates may be moved step-wise through the process chamber 2 one zone at a time.

Figure 3:
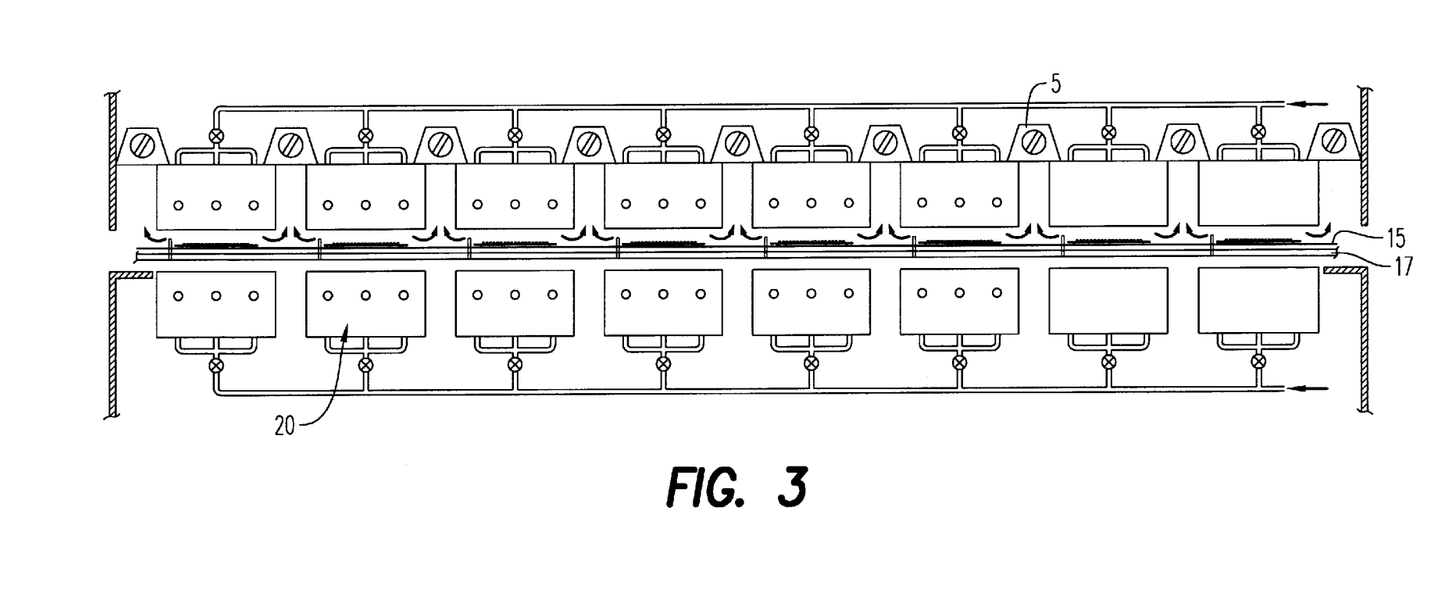
FIG. 3 is a side view showing in more detail the process chamber of the oven of FIG. 1.

Referring now to FIG. 3 the general structure of one of the tunnels 4,4' of the process chamber 2 will be described. It will be understood that the two tunnels 4,4' are identical and only one needs to be described. The tunnel comprises a number of zones 20 (in this example eight zones are provided) of equal length in the process direction. It will be understood from the previous description of the movement of the substrates through the process chamber that each substrate spends an identical period of time stopped at each zone in turn. A number of the zones will be allocated as heating zones, and the remainder will be used as cooling zones. The number of heating zones and the number of cooling zones may be chosen as desired, and since the substrates spend the same amount of time at each zone, the ratio of heating zones to cooling zones will reflect the time that the substrates are to be heated as opposed to being cooled. In this embodiment zones 1 to 6 are heating zones, while zones 7 and 8 are cooling zones. The temperature at different heating zones may be the same, but may also differ depending on whether a particular heating zone is part of the preheating phase of the reflow process, or the spike phase of the reflow process.

Each zone, whether a heating zone or a cooling zone, is comprised of upper and lower blocks of approximately the same size. A narrow gap is defined between the upper and lower blocks of each zone and the substrates pass through this gap on the tension wire assemblies 15. As will be described in more detail below, both the heating zones and the cooling zones are supplied with a gas (eg nitrogen or air) for the purpose of heating or cooling respectively. In this embodiment of the invention fresh nitrogen or air is constantly supplied rather than being recirculated in order to avoid contamination problems, for example flux condensation, within the process chamber. Although fresh gas is supplied, the overall consumption of gas is not necessarily higher than a conventional oven using recirculation because of the overall heating and cooling efficiency of the present embodiment of the invention.

Figure 4:
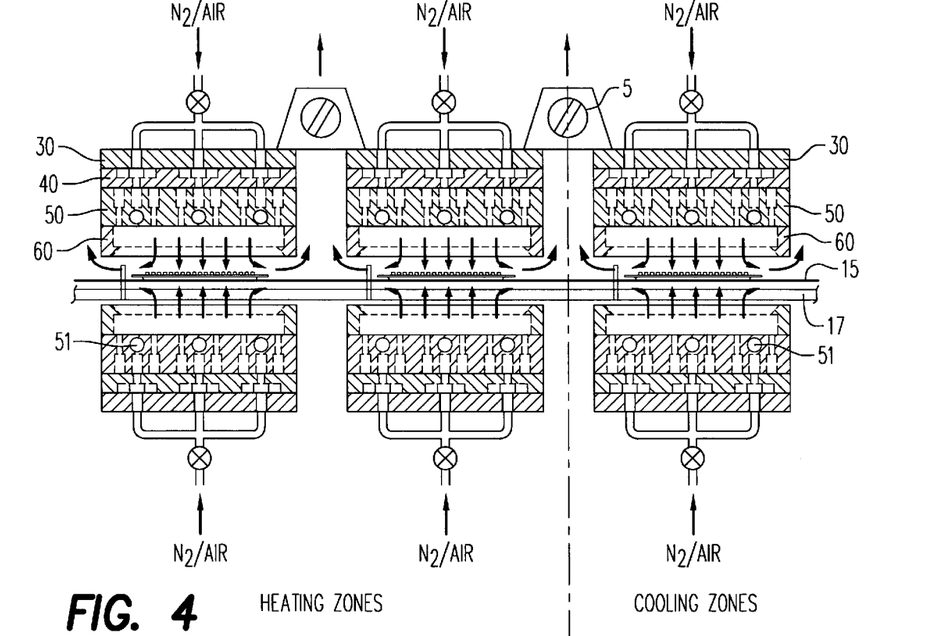
FIG. 4 is a side view showing the heating and cooling zones of the process chamber of FIG. 3.
Figure 5:
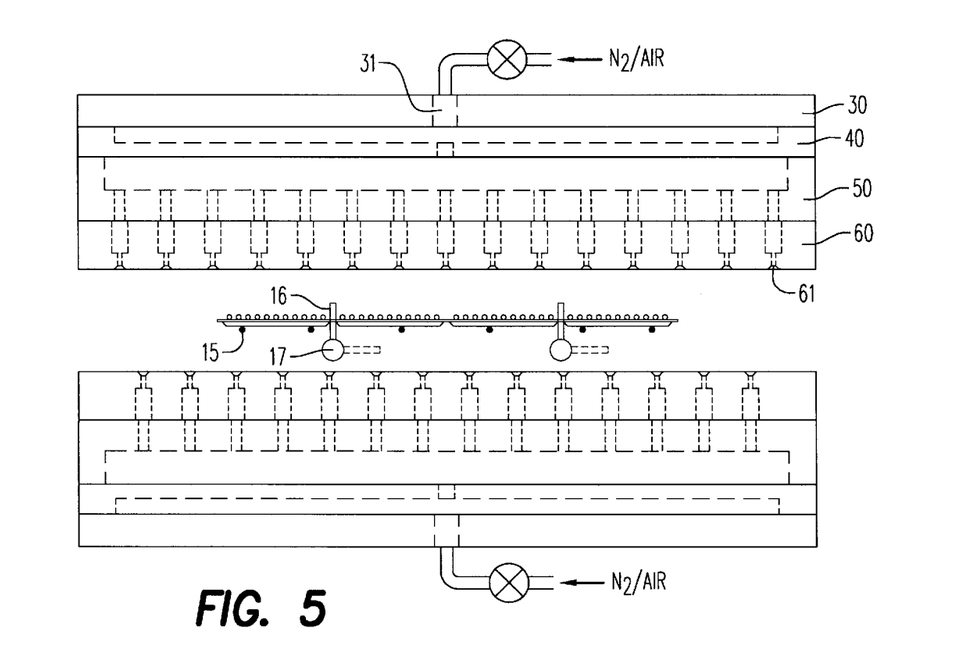
FIG. 5 is an end view of the heating zone.

The structure of the heating and cooling zones is shown in FIGS. 4 and 5. FIG. 4 shows three zones in side view. These are the last two heating zones (eg zones 5 and 6) 10 and the first cooling zone (eg zone 7). FIG. 5 shows an end view of one of the heating zones, and as it will be seen from the following description that the heating and cooling zones are substantially identical except for the provision of heating elements in the heating zones, it will be understood that FIG. 5 is relevant to the cooling zones as well as to the heating zones. Furthermore it will be noted from FIG. 4 that the upper and lower blocks have the same structure, and indeed normally the upper and lower blocks of any one zone will be heated (or cooled as the case may be) to the same temperature, and therefore only the upper blocks will be described.

Each block is formed of four plates: a cover plate 30, routing plate 40, distribution plate 50 and panel plate 60 in that sequence with the panel plate 60 being the plate adjacent the gap between the blocks. These plates are formed in close contact and are formed of a material of good thermal conductivity (such as a metal) so that the plates may be regarded as all being at substantially the same temperature. The cover plate 30 is formed with a number of inlets 31 (three in this example) for connecting with a source of gas. The routing plate 40 and the distributing plate 50 are formed with a number of channels and conduits that will be described in more detail below, but the function of which is to form an even flow of gas that is discharged to the surface of a substrate though a number of apertures 61 formed in the panel plate 60 that extend parallel to the process direction and facing the substrate as it passes through the gap between the upper and lower blocks. It will also be noticed that three bores 51 are formed in the distributing plate 50 extending in a direction at right angles to the process direction. In the heating zones these bores 51 are used to receive heating elements that serve to heat the gas, while in the cooling zones these bores 51 may be used for the passage of cooling water so as to cool the gas. Gas, whether for heating or cooling, is removed after being applied to the substrates by means of valves 5 located between each pair of zones as previously described. The openings 61 are formed with a V-shaped groove to maximize the uniformity of the gas flow discharged from the openings. The openings 61 are spaced by a pitch that is relatively small, say about 5 to 10 mm, to avoid any dead area that has no or only little gas flow.

Figure 6:
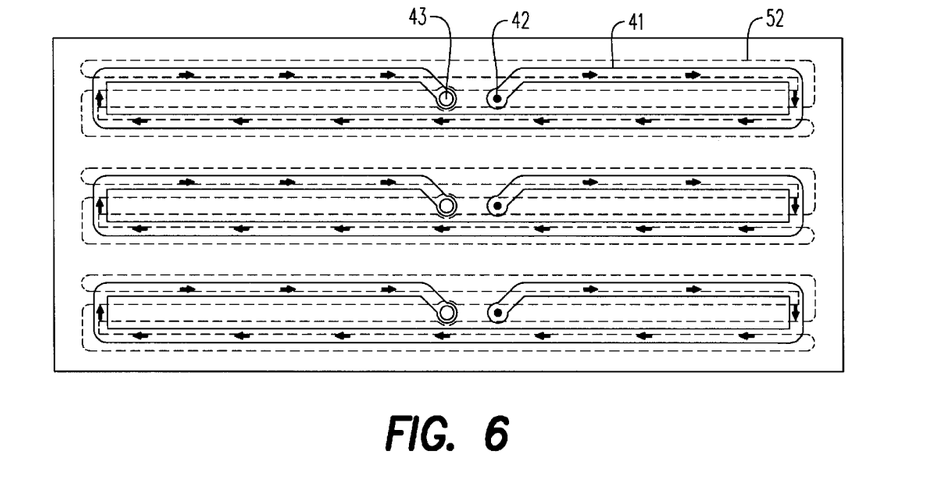
FIG. 6 is a top view of the heating zone showing the routing and distribution plates.

Turning now to FIG. 6 this shows a heating zone in section at the junction between the routing 40 and distributing 50 plates. Both plates are formed with serpentine channels 41,52 that form conduits for the flow of gas. In FIG. 6 the channels 41 formed in the routing plate 40 are shown in solid lines, while the channels 52 in the distributing plate 50 below are shown in broken lines. The routing plate 40 receives gas from the cover plate 30 at three inlets 42 located halfway along the plate. Each inlet 42 is connected to channel 41 that leads the gas along the length of the plate (ie right angle to the process direction) to the end, and then back along the entire length of the plate in a opposite direction, and then back for half the length of the plate in a direction at right angle to the process direction to an intersection 43 between the routing plate 40 and the distributing plate 50 that is adjacent the inlet 42 from the cover plate 30. The function of these channels 41 formed in the routing plate 40 is to give the gas (which is received at an ambient temperature) time to heat up to a temperature close to the temperature of the plates. Because this warming of the gas is not essential in the cooling zones, the routing plate can be omitted in the cooling zones.

Figure 7:
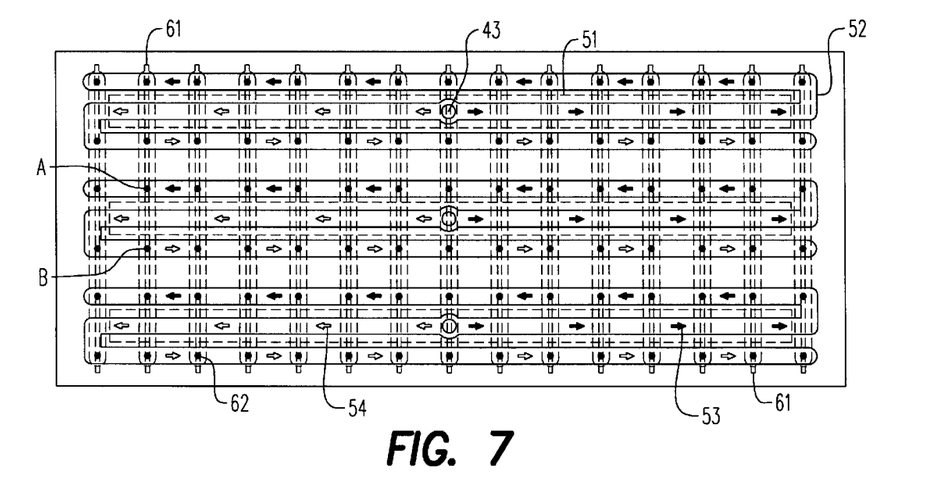
FIG. 7 is a top view of the heating zone showing the distributing and panel plates.

As can be seen from FIG. 7, the three intersections 43 from the routing plate 40 to the distributing plate 50 connect to three serpentine channels 52 formed in the distributing plate 50. Each serpentine channel 52 in the distributing plate 50 is formed of three sections extending perpendicular to the process direction. The central of these three sections is connected to the two outer sections by two connecting portions. One of the connecting portions is formed at the end of the distributing plate so; the other is formed at the other end of the distributing plate 50. The intersection 43 from the routing plant 40 connects with the serpentine channel 52 at a junction that is halfway along the central section of the serpentine channel 52.

Referring again to FIG. 7, it will be seen that the openings 61 in the panel plate 60 for the discharge of gas to the surface of the substrate extend at right angles to the serpentine channels 52 formed in the distributing plate 50. The openings 61 in the panel plate extend across substantially the fill width of the panel plate 60 (ie parallel to the process direction) and at every point 62 where one of the openings 61 in the panel plate 60 and an outer section of the serpentine channel 52 in the distributing plate intersect, an intersection is formed allowing gas to flow from the serpentine channels 52 in the distributing plate 50 to the openings 61 in the panel plate 60. As gas enters the serpentine channels 52 formed in the distributing plate 50 at a point halfway along the length of that channel the gas is allowed to flow in both directions from the intersection 43 with the routing plate 40 as shown by the dark 53 and light 54 arrows in FIG. 7.

Gas is discharged from each of the intersections 62 between the serpentine channel 52 of the distributing plate 50 and the openings 61 in the panel plate 60, but it will be appreciated that the pressure of the gas discharged from the openings will be less the further away the openings is from the intersection 43 between the routing plate 40 and the distributing plate 50. However, because gas flows from the intersection in both directions 53,54, the intersections 62 between the serpentine channel 52 and the openings 61 from the panel plate 60 are formed in adjacent pairs, and the average distance from the intersection 43 with the routing plate 40 to the intersections 62 with the panel plate 60 is always the same. As an example of this, consider intersection A that leads from the distributing plate to the opening formed in the panel plate. Although this is the penultimate intersection reached by the gas flowing in the direction of the dark arrows (and therefore the gas pressure at this point will be weak), it is adjacent to intersection B which is only the second intersection reached by the gas flowing in the direction of the light arrows (and hence the gas pressure here will still be relatively high). This is the case for the whole length of the serpentine channels 52. Each pair of intersections 62 with one of the openings 61 of the panel plate 60 will have one intersection with relatively weak gas pressure, and one with relatively strong gas pressure. The exception to this of course is the panel plate opening 61 that intersects the serpentine channel 52 on the same line as the three intersections 43 between the serpentine channels and the routing plate. At these intersections the distances and hence the gas pressures are equal. The effect of this arrangement of channels and intersections in the cover, routing, distributing and panel plate is to provide as even and uniform flow of gas over the surface of a substrate as is possible.

It will be understood that the abovedescribed embodiment of the present invention provides a uniform controlled flow of heated gas to enable reliable even convection heating of a substrate. In addition, however, further heating effect is obtained by radiation heating from the panel plate 60. The lower surface of the panel plate 60 (ie facing the substrate) is substantially a flat surface and because the openings 61 do not form a substantial part of the surface area, the radiation heat emitted from the panel plate 60 is also very uniform.

Figure 8:
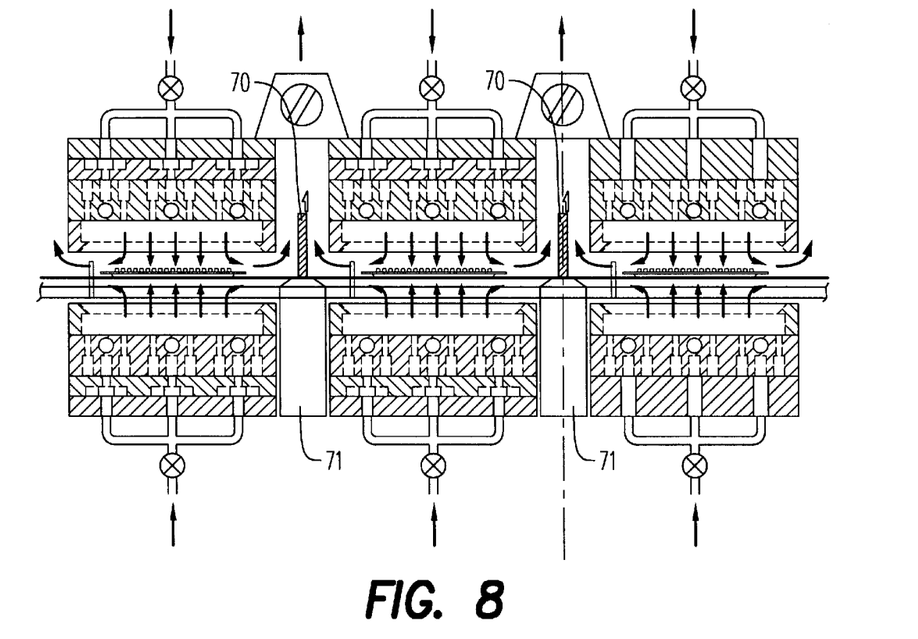
FIG. 8 shows the heating and cooling zones in one configuration.
Figure 9:
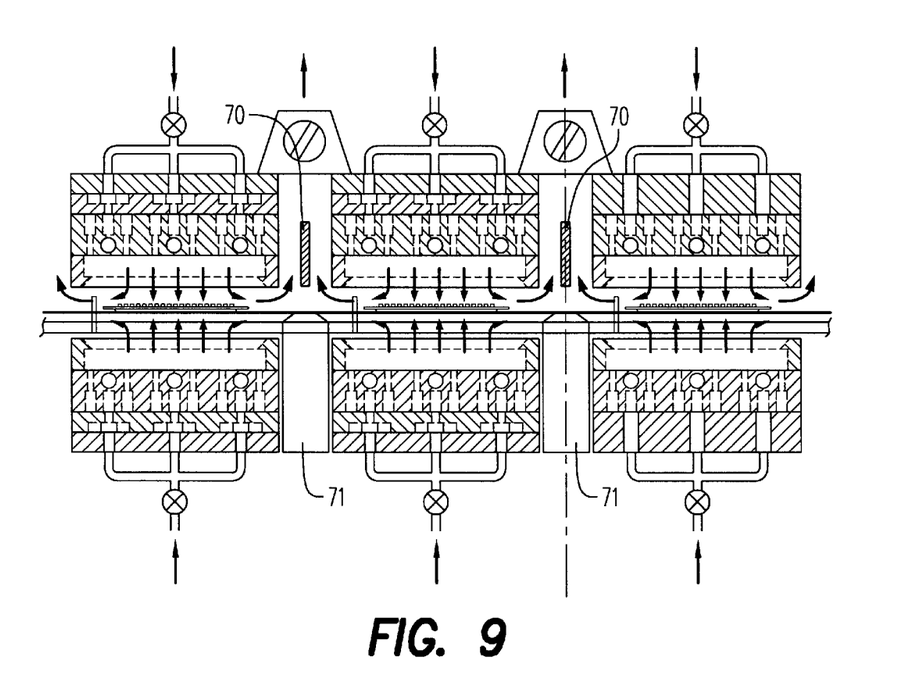
FIG. 9 shows the heating and cooling zones in an alternate configuration.

Referring to FIGS. 8 and 9, a possible embodiment is shown in which in order to prevent the gas flows in adjacent zones from interfering with each other, shutters 70 are provided between zones which may be moved between a position shown in FIG. 9 in which they separate two adjacent zones from each other, and a position as shown In FIG. 9 in which they are moved to allow substrates to be transferred between zones. Between adjacent zones are provided supporting members 71 for supporting the substrates when they are between blocks.

Figure 10:
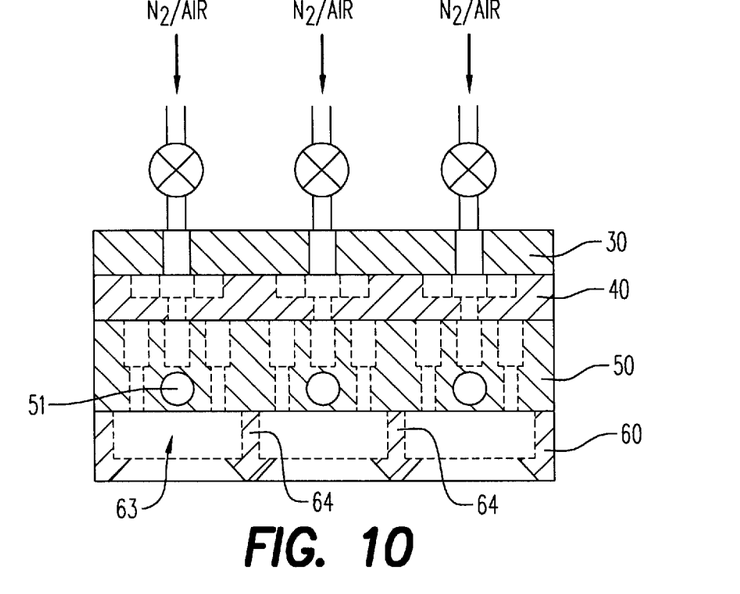
FIG. 10 shows a heating block in more detail.
Figure 11:
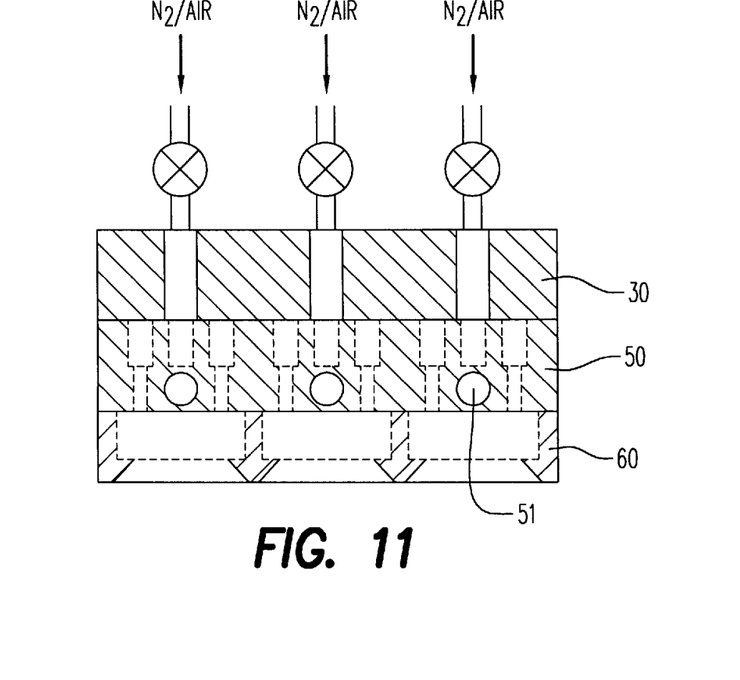
FIG. 11 shows a cooling block in more detail.

FIGS. 10 and 11 show further variations on the design of the blocks of the heating (FIG. 10) and cooling (FIG.11) zones. Whereas in the main embodiment a single supply of gas is divided into three parts before being supplied to the cover plate 30, in the variation of FIGS. 10 and 11 three separate sources of gas may be provided each with their own control valve. Furthermore the panel plate may be divided into three sections 63 by walls 64 such that each zone is divided into three sub-zones which may be controlled independently. In particular different gas flow rates may be provided in each subzone. This possibility is particularly useful for large substrates where some regions of the substrate may be cooler than others because of receiving less radiation heat thus requiring additional gas flow to increase the convection heating.

Figure 12:
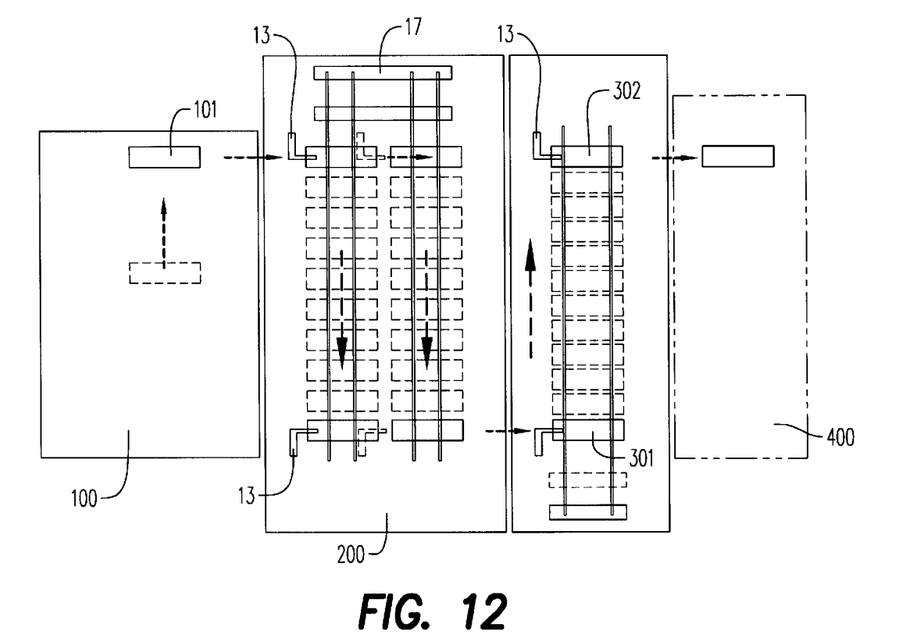
FIG. 12 is a plan view of a BGA manufacturing system incorporating a reflow oven according to an embodiment of this invention.

One major advantage of the solder reflow of the present invention is that it may be easily incorporated into a BGA manufacturing process. An example of this will now be described with reference to FIG. 12. FIG. 12 shows a part of a production process comprising a ball placement station 100, solder reflow oven 200, cleaner 300, and a further process module 400. At the ball placement station solder balls are placed on the BGA substrate 101 in any known manner and are then moved to an end of the ball placement station from where they are moved laterally to the input positions of the two tunnels of the reflow oven 200. The substrates then pass through the reflow oven as described above and reach the output station from where they are transferred laterally to a cleaner 300. The structure of the output station is similar to the input station. Processed substrates are received from the tunnels 4,4' of the oven onto output platforms from which they are then moved by an outlet kicker means driven by a kicker motor. In the cleaner the substrates are moved by a transport mechanism of the same type as the transport mechanism of the reflow oven. It will be seen that in the cleaner the substrates are moved in a direction opposite to the direction of movement of the substrates in the oven. The substrates are moved onto and off the cleaner by input and output stations including kickers 13 and input and output platforms 301,302 in a manner similar to the oven and similarly are moved along the cleaner, for example by transfer mechanism 17. After the cleaning process is complete, the substrates are then moved laterally onto a further process module where any desired further processing may be carried out such as the singulation of the substrate into individual BGA packages. It should be noted here that when the substrates are being transferred between modules or processing units of the manufacturing process, they are transferred laterally at right angles to the process direction through which the substrates are moved within the process chamber of the reflow oven and also within the cleaner.

The oven of preferred embodiments of the present invention is relatively small and compact in comparison with conventional ovens. Each zone within the process chamber is of a size just slightly larger than a substrate (for example about 260 mm by 75 mm). In the example described above, with two tunnels, this will lead to an approximate size for the oven of about 1.5 m in the process direction by 0.9 m in the direction perpendicular to the process direction. This compares favourably with conventional PCB ovens which may be up to 4 m in length.

What is claimed is:

1. A solder reflow oven for the processing of components bearing solder, comprising: input means for introducing components into said oven, a processing chamber within which said component are subject to a solder reflow process, and output means for discharging components from said oven for further processing or handling, and means for transferring said components through said processing chamber in a first direction towards said output means, wherein said processing chamber comprises a plurality of heating and cooling zones arranged with a constant pitch in the first direction, and wherein said transferring means is adapted to move said components in said first direction in stages, with each component moving a distance equal to the pitch between two zones in each stage, whereby the components are moved from zone to zone in stages.

2. A solder reflow oven as claimed in claim 1 wherein said components are supplied to said input means in a second direction perpendicular to said first direction, and wherein said components are discharged from said output means in said second direction.

3. A solder reflow oven as claimed in claim 1 wherein said processing chamber comprises two parallel tunnels extending in said first direction, each said tunnel being provided with heating and cooling zones.

4. A solder reflow oven as claimed in claim 1 comprising a tension wire assembly for supporting said components in said processing chamber.

5. A solder reflow oven as claimed in claim 4 wherein said transfer means comprises a plurality of transfer pins arranged in said first direction spaced apart by the pitch of said zones, wherein means are provided for moving said transfer pins between a first position in which they extend through said tension wire assembly to engage said components and a second position in which said transfer pins do not so extend, and wherein means are provided for moving said pins in said first direction by the pitch of said zones when said pins are in their first position, and for moving said pins in a direction opposite to said first direction when said pins are in their second position.

6. A solder reflow oven as claimed in claim 5 wherein said transfer pins are secured to at least one transfer rod, and wherein means are provided to rotate said rod so as to move the pins between said first and second positions, and wherein means are provided to reciprocate said rod along said first direction by an amount equal to the pitch between zones.

7. A solder reflow oven as claimed in claim 1 wherein each said heating zone and each said cooling zone comprises upper and lower blocks, and wherein said components are transferred in said first direction between said upper and lower blocks.

8. A solder reflow oven as claimed in claim 7 wherein each said block of each said heating zone and each said block of each said cooling zone is connected to a source of fresh gas, and wherein each block of each said heating zone is provided with means for heating said gas, and each block of each said cooling zone is provided with means for cooling said gas.

9. A solder reflow oven as claimed in claim 7 wherein each block is formed with a serpentine channel between said source of fresh gas and at least one opening through which said gas is discharged from said block towards a component.

10. A solder reflow oven as claimed in claim 9 wherein said block is provided with a plurality of said openings in the form of slots extending parallel to said first direction and each said slot being formed with a V-shaped opening.

11. A solder reflow oven as claimed in claim 9 wherein said slots are spaced from each other by a constant pitch at right angles to the first direction.

12. A solder reflow oven as claimed in claim 9 wherein three channels are formed between a single source of said fresh gas and a plurality of discharge openings.

13. A solder reflow oven as claimed in claim 9 wherein three channels are formed each connected to a separate source of fresh gas and leading to separate groups of discharge openings.

14. A solder reflow oven as claimed in claim 13 wherein said separate groups of discharge openings are divided by partition members.

15. A solder reflow oven as claimed in claim 9 wherein each said block comprises a plurality of plates and wherein said serpentine channel comprises a channel formed in at least one of said plates.

16. A solder reflow oven as claimed in claim 15 wherein a said block of a heating zone comprises:
(a) a first plate formed with at least one inlet for receiving fresh gas,
(b) a second plate formed with a channel connected to said inlet of said first plate, said channel extending in the plane of said second plate and leading to an outlet from said second plate,
(c) a third plate formed with at least one heating element and with at least one serpentine channel connected to said outlet from said second plate and being provided with a plurality of outlets, and
(d) a fourth plate formed with a plurality of openings for discharging heated gas to a said component, said openings being connected to said plurality of outlets from said third plate.

17. A solder reflow oven as claimed in claim 16 wherein said at least one serpentine channel formed in said third plate comprises three elongate sections, a first and a second of said sections being connected at one end, and the second and a third of said sections being connected at the other end, wherein said outlet from said second plate connects with said serpentine channel at a point midway along said second section, and wherein said openings from said serpentine channel are formed at regular intervals along said first and third sections.

18. A solder reflow oven as claimed in claim 17 wherein the discharge openings from said fourth plate comprise slots that extend perpendicular to said sections of said serpentine channel of said third plate and the said openings from said third plate are located at the intersections of said sections and said slots.

19. A solder reflow oven as claimed in claim 15 wherein a said block of a cooling zone comprises:
(a) a first plate formed with at least one inlet for receiving fresh gas,
(b) a second plate connected to an outlet from said first plate and formed with at least one cooling means and with at least one serpentine channel connected to said first plate and being provided with a plurality of outlets, and
(c) a third plate formed with a plurality of openings for discharging cooled gas to a said component, said openings being connected to said plurality of outlets from said second plate.

20. A solder reflow oven as claimed in claim 19 wherein said at least one serpentine channel formed in said second plate comprises three elongate sections, a first and a second of said sections being connected at one end, and the second and a third of said sections being connected at the other end, wherein said outlet from said first plate connects with said serpentine channel at a point midway along said second section, and wherein said openings from said serpentine channel are formed at regular intervals along said first and third sections.

21. A solder reflow oven as claimed in claim 20 wherein the discharge openings from said third plate comprise slots that extend perpendicular to said sections of said serpentine channel of said second plate and the said openings from said second plate are located at the intersections of said sections and said slots.

22. A solder reflow oven as claimed in 1 comprising separation member for separating said zone from each other.

23. A solder reflow oven as claimed in claim 22 wherein said separation members are movable between a first position in which they separate said zones, and a second position in which they are moved away to allow the transfer of components between zones.

24. A solder reflow oven as claimed in claim 1 wherein means are provided for supplying gas to said zones, said gas being heated or cooled respectively in said zones before being applied to a said component, and wherein means are provided for extracting said gas after the gas has been applied to said component, said extracting means comprising a control valve located between each adjacent pair of zones.

25. A solder reflow oven as claimed in claim 24 wherein the said control valves associated with heating zones are connected to a chamber for receiving heating gas, and the said control valves associated with cooling zones are connected to a chamber for receiving cooling gas.

26. A solder reflow oven as claimed in claim 25 wherein a gas curtain connected to a gas curtain chamber is provided in front of the first zone.

27. A solder reflow oven as claimed in claim 26 wherein said heating gas chamber, said cooling gas chamber, and said curtain gas chamber are all connected to a single gas pump.

28. A solder reflow oven for the processing of components bearing solder, comprising: input means for introducing components into said oven, a processing chamber within which said components are subject to a solder reflow process, and output means for discharging components from said oven for further processing or handling, and means for transferring said components through said processing chamber in a first direction towards said output means, wherein said processing chamber comprises a plurality of heating and cooling zones, wherein each said block of each said heating zone and each said block of each said cooling zone is connected to a source of fresh gas, wherein each block of each said heating zone is provided with means for heating said gas, and each block of each said cooling zone is provided with means for cooling said gas, and wherein each block is formed with a serpentine channel between said source of fresh gas and at least one opening through which said gas is discharged from said block towards a component.

29. A solder reflow oven as claimed in claim 28 wherein said block is provided with a plurality of said openings in the form of slots extending parallel to said first direction and each said slot being formed with a V-shaped opening.

30. A solder reflow oven as claimed in claim 28 wherein said slots are spaced from each other by a constant pitch at right angles to the first direction.

31. A solder reflow oven as claimed in claim 28 wherein three channels are formed between a single source of said fresh gas and a plurality of discharge openings.

32. A solder reflow oven as claimed in claim 28 wherein three channels are formed each connected to a separate source of fresh gas and leading to separate groups of discharge openings.

33. A solder reflow oven as claimed in claim 32 wherein said separate groups of discharge openings are divided by partition members.

34. A solder reflow oven as claimed in claim 28 wherein each said block comprises a plurality of plates and wherein said serpentine channel comprises a channel formed in at least one of said plates.

35. A solder reflow oven as claimed in claim 34 wherein a said block of a heating zone comprises:
   (a) a first plate formed with at least one inlet for receiving fresh gas,
   (b) a second plate formed with a channel connected to said inlet of said first plate, said channel extending in the plane of said second plate and leading to an outlet from said second plate,
   (c) a third plate formed with at least one heating element and with at least one serpentine channel connected to said outlet from said second plate and being provided with a plurality of outlets, and
   (d) a fourth plate formed with a plurality of openings for discharging heated gas to a said component, said openings being connected to said plurality of outlets from said third plate.

36. A solder reflow oven as claimed in claim 35 wherein said at least one serpentine channel formed in said third plate comprises three elongate sections, a first and a second of said sections being connected at one end, and the second and a third of said sections being connected at the other end, wherein said outlet from said second plate connects with said serpentine channel at a point midway along said second section, and wherein said openings from said serpentine channel are formed at regular intervals along said first and third sections.

37. A solder reflow oven as claimed in claim 36 wherein the discharge openings from said fourth plate comprise slots that extend perpendicular to said sections of said serpentine channel of said third plate and the said openings from said third plate are located at the intersections of said sections and said slots.

38. A solder reflow oven as claimed in claim 34 wherein a said block of a cooling zone comprises:
   (a) a first plate formed with at least one inlet for receiving fresh gas,
   (b) a second plate connected to an outlet from said first plate and formed with at least one cooling means and with at least one serpentine channel connected to said first plate and being provided with a plurality of outlets, and
   (c) a third plate formed with a plurality of openings for discharging cooled gas to a said component, said openings being connected to said plurality of outlets from said second plate.

39. A solder reflow oven as claimed in claim 38 wherein said at least one serpentine channel formed in said second plate comprises three elongate sections, a first and a second of said sections being connected at one end, and the second and a third of said sections being connected at the other end, wherein said outlet from said first plate connects with said serpentine channel at a point midway along said second section, and wherein said openings from said serpentine channel are formed at regular intervals along said first and third sections.

40. A solder reflow oven as claimed in claim 39 wherein the discharge openings from said third plate comprise slots that extend perpendicular to said sections of said serpentine channel of said second plate and the said openings from said second plate are located at the intersections of said sections and said slots.

41. A solder reflow oven as claimed in 28 comprising separation members for separating said zones from each other.

42. A solder reflow oven as claimed in claim 41 wherein said separation members are movable between a first position in which they separate said zones, and a second position in which they are moved away to allow the transfer of components between zones.

* * * * *